May 29, 1962  J. R. WILHELM  3,036,711
FILTER UNIT
Filed Jan. 6, 1959
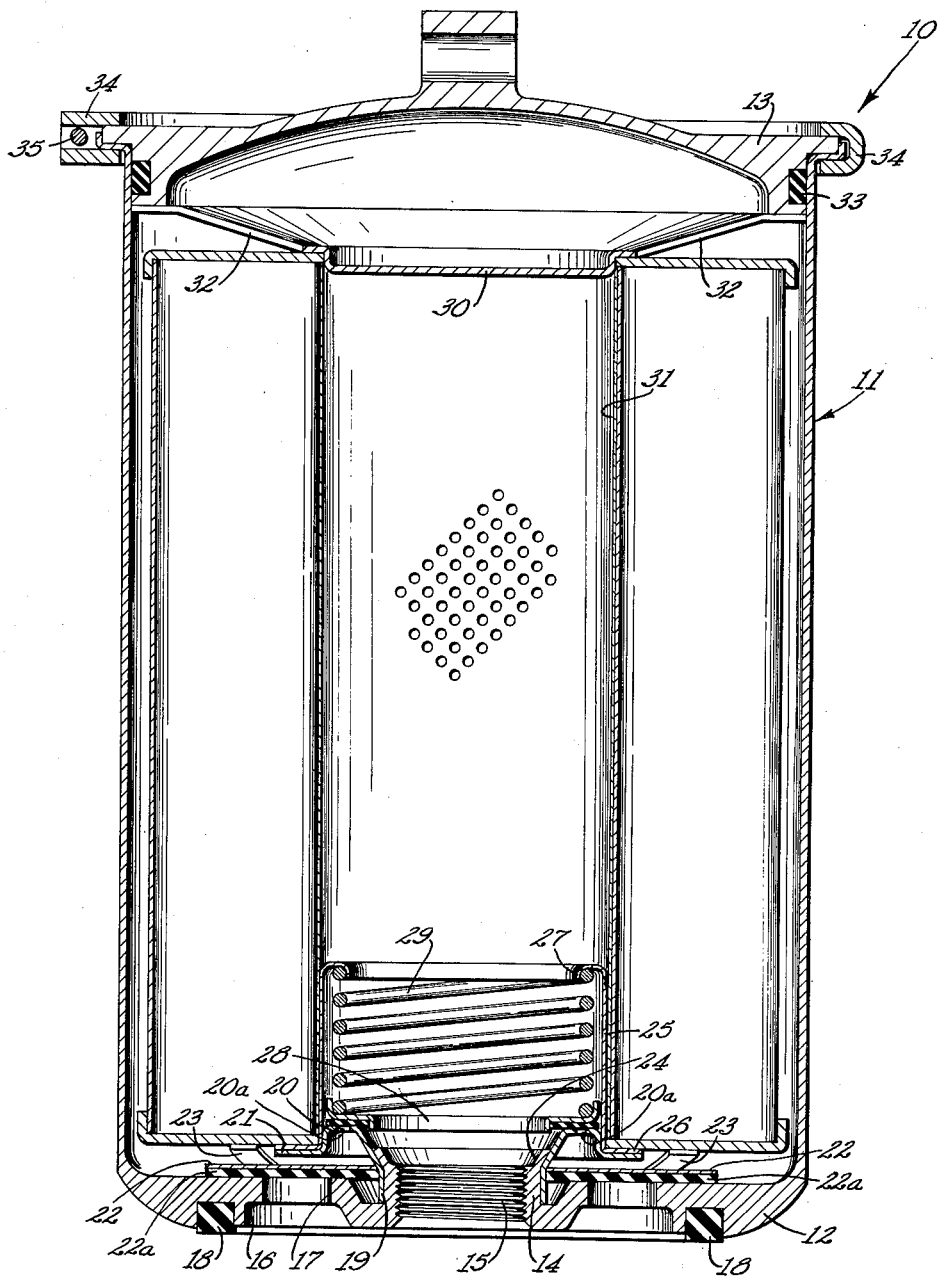
INVENTOR.
JOHN R. WILHELM
BY Lawrence J. Winter
ATTORNEY

United States Patent Office 3,036,711
Patented May 29, 1962

3,036,711
FILTER UNIT
John R. Wilhelm, Perth Amboy, N.J., assignor to Purolator Products, Inc., Rahway, N.J., a corporation of Delaware
Filed Jan. 6, 1959, Ser. No. 785,176
1 Claim. (Cl. 210—130)

The present invention relates to a filter unit and more particularly to a filter unit adapted to be mounted on the engine block of an internal combustion engine.

The present invention is an improvement over the filter unit shown and described in copending application Serial No. 667,777, filed June 25, 1957, now abandoned, inventor William H. Hultgren. In the copending application there is described a disposable or throwaway type of filter unit commonly used on a full flow type filter utilized in modern vehicles. When the filter element therein has become clogged with contaminants so that it is longer serviceable, the entire unit is discarded as the filter element is permanently sealed within the casing and a new filter unit is mounted on the engine. It can be readily seen that this type of filter can become expensive because of the cost of materials and labor that goes into the many individual parts comprising the filter unit which are discarded along with the filter element before they have attained the useful service life for which they were designed.

In accordance with the present invention, a filter unit is provided similar thereto, except that the casing is made of impacted extruded aluminum formed from a single piece of material and provided with a detachable cover which permits replacement of the filter element therein without discarding the rest of the unit before the other parts therein have served their designed service life.

Another object of the present invention is to provide a filter unit which is of simple and facile construction so as to reduce the expense involved in manufacturing it.

Another object of the present invention is to provide a filter unit having retainer means therein for keeping the individual parts therein from falling out of the filter casing when the filter element is replaced.

Another object of the present invention is to provide retainer means in a replaceable type filter unit which prevents the parts therein from becoming misarranged when the cover of the filter unit is removed for replacing the filter element therein.

Another object of the present invention is to provide a relief valve positioned in the filter unit so that liquid is passed through the casing in a short circuited flow path when the filter becomes clogged and prevents caked dirt and contaminants from being washed downstream.

Further objects and advantages of the present invention will be seen when considered in connection with the accompanying drawing forming a part thereof and showing an elevational sectional view of the filter unit of the present invention.

Referring to the drawing, the reference numeral 10 designates a filter unit comprising a cylindrical casing 11 and bottom 12 formed integral therewith from a single piece of aluminum material that has been extruded and impacted into the desired configuration. A detachable cover 13 is provided for closing off the open end of the casing. The bottom 12 of the casing comprises a circular section turned upwardly as at 14 to form a concentric nipple 15 therein provided with threads thereon. The portion of bottom 12 adjacent nipple 15 has an annular recess 16 in which are disposed spaced inlet ports 17 therearound for flowing oil to be filtered into the interior of the casing 11. An annular resilient gasket 18, rectangular in cross section, is press fitted into recess 16 and is of sufficient thickness so the lower end extends slightly below the lower surface of bottom 12 to form a fluid tight seal against the engine block of an internal combustion engine when the filter unit is mounted on it. The filter unit is mounted against the engine block through an adapter member adjacent an annular inlet chamber disposed in the engine block as shown and described in the above copending patent application.

An inverted conical member 19 is mounted on nipple 15 and has a laterally extending horizontal portion 20 thereon terminating in a peripheral rim 21 forming a shoulder to support the filter element on. Portion 20 is spaced from bottom 12 and has a plurality of spaced by-pass ports 20a therein for by-passing oil around the filter unit when it becomes clogged, as hereinafter described. An annular check valve 22 formed of thin sheet metal with a gasket 22a secured thereon is positioned over inlet ports 17 and has upwardly extending resilient projections or tongues 23 thereon. The check valve is mounted on member 19 and underlies portions 20 and 21 thereof. The upper extremity of the nipple 15 is belled or flared outwardly to provide a rim 24 to retain element support cup or member 19 and the anti-drain back valve or check valve 22 permanently disposed in the filter casing so they will not become misarranged or fall out when cover 13 is removed for replacing the filter element therein.

A relief or by-pass valve is disposed on member 19 and comprises a hollow sleeve 25 having an outwardly extending rim 26 on the lower edge thereof and an inwardly turned rim 27 on the upper edge thereof. Rim 26 is preferably tack welded to member 19 and rests on the shoulder thereof provided by peripheral rim 21. An annular by-pass valve disc 28 is disposed within the sleeve over by-pass ports 20a being retained thereagainst by compression spring 29 within the sleeve.

An annular convoluted filter element preferably made of pleated paper impregnated with phenolic resin is disposed in casing 11 on rim 26 of member 19. The upper end of the filter element is sealed by member 30 inserted in center tube 31 of the element and has resilient fingers 32 thereon which press against the bottom of cover 13 and thereby cause the filter element to be kept seated on rim 26 to prevent oil flowing through the casing from bypassing the filter.

Cover 13 is provided with a gasket 33 in the perimeter thereof and is detachably connected to the filter casing 11 by a conventional split ring clamp 34, not a part of the invention, which may be tightened or loosened by bolt 35.

It will be noted that check valve 22 is maintained seated against inlet ports 17 by the resilient projections 23 thereon which press against the lower end of the filter element.

When the filter unit is mounted on an engine block, oil enters the casing through inlet ports 17 and the oil pressure causes check valve 22 to lift from its seat so that the incoming oil passes around the outside of filter element and through it and is thereafter discharged through the center tube of the filter element and passes through sleeve 25 and out of the casing through nipple 15 back to the engine.

When the filter element becomes clogged with dirt and requires replacement it is merely necessary to unclamp or loosen ring clamp 34 and remove cover 13 from the casing for replacement of the filter element therein. Since sleeve 25 of the by-pass valve is tack welded to member 19 and rim 24 on nipple 15 prevents conical member 19 and check valve 22 from becoming misarranged or falling out of the housing, the filter element can be readily replaced without any of the parts becoming lost.

Should the filter element be clogged for any reason before it can be replaced, the engine will not be starved of oil because the oil pressure will cause check valve 22 to unseat so the oil will pass directly from inlet ports 17 into by-pass ports 20a and be immediately discharged from the filter unit through nipple 15 completely short-circuiting the usual flow path of the oil in the filter unit. This prevents the rapid flow of oil through the filter unit from washing off or carrying caked dirt and contaminants downstream into the vital working parts of the engine since the oil flowing through the unit at this time will not come in contact with the deposited contaminants on the outside of the filter element.

Inasmuch as various changes may be made in the form, location and relative arrangement of the several parts without departing from the essential characteristics of the invention, it will be understood that the invention is not limited except by the scope of the appended claim.

What is claimed is:

An oil filter including a casing made from a single piece of metal shaped to provide a tubular side wall and an end wall that is substantially thicker than the side wall, and integrally forms a centrally located, internally threaded oil outlet nipple projecting inwardly from its inside and a gasket groove extending inwardly from its outside and surrounding the adjacent end of said nipple, the end wall having oil inlet ports formed through it at locations between the nipple and groove and the inside of the end wall having flat portions surrounding these ports, an annular check valve formed of thin material having a central hole and portions seating on said flat portions and means for biasing said portions to seat thereon, an annular member having a projecting tubular end inserted through the check valve's hole and closely encircling said nipple, the latter being deformed radially outwardly against the inside of this projecting tubular end to permanently mount this member and the check valve on the nipple, said member extending from its tubular end and forming a laterally extending annular valve seat, registered with said nipple, and a peripheral rim surrounding this seat, and a hollow sleeve having at one end an outwardly extending rim fitted on said peripheral rim and permanently fastened thereto, the other end of said sleeve having an inwardly turned rim, said annular valve seat having oil by-pass ports formed therethrough, an annular oil by-pass valve seated on said annular valve seat, and a coil compression spring located within said sleeve and having one end pressing against said inwardly turned rim and its other end pressing against said by-pass valve to bias the latter closed.

References Cited in the file of this patent

UNITED STATES PATENTS

| | | |
|---|---|---|
| 1,821,082 | Tyler | Sept. 1, 1931 |
| 2,212,647 | Nugent | Aug. 27, 1940 |
| 2,598,322 | Vokes | May 27, 1952 |
| 2,731,154 | Burnell | Jan. 17, 1956 |
| 2,877,902 | Chase | Mar. 17, 1959 |
| 2,888,141 | Coates et al. | May 26, 1959 |